United States Patent

[11] 3,610,975

| [72] | Inventor | Nikolaus Onjanow<br>Williamsville, N.Y. |
|---|---|---|
| [21] | Appl. No. | 846,166 |
| [22] | Filed | July 30, 1969 |
| [45] | Patented | Oct. 5, 1971 |
| [73] | Assignee | Westinghouse Electric Corporation<br>Pittsburgh, Pa. |

[54] DYNAMOELECTRIC MACHINE WITH IMPROVED COOLING MEANS
7 Claims, 3 Drawing Figs.

[52] U.S. Cl. .................................................. 310/57, 310/63
[51] Int. Cl. .................................................. H02k 9/08
[50] Field of Search .......................................... 310/57, 58, 59, 60–65

[56] References Cited
UNITED STATES PATENTS

| 1,320,781 | 11/1919 | Mossay | 310/57 |
|---|---|---|---|
| 1,405,616 | 2/1922 | Mossay | 310/57 |
| 2,185,740 | 1/1940 | Smith | 310/57 |
| 2,413,525 | 12/1946 | Smith | 310/57 |
| 2,783,398 | 2/1957 | Haas et al. | 310/57 |
| 1,858,261 | 5/1932 | Barnholdt | 310/57 X |
| 1,959,608 | 5/1934 | Ansingh | 310/57 |

*Primary Examiner*—D. F. Duggan
*Attorneys*—F. Shapoe, C. L. Menzemer and G. H. Telfer ABSTRACT: Heat transfer from heat-producing parts to the exterior of enclosed machines, particularly totally enclosed, fan cooled machines, is improved by a structure including a channeled frame with an inner surface in essentially total contact with the stator core. The frame channels are of a number and configuration to leave a direct radial heat transfer path through metal from the core to the exterior over most of the surface. Interior fans provide internal air circulation between end bracket spaces through the frame channels and back through rotor channels. The end brackets are shaped around the interior fans for making the air turbulent and increasing heat transfer to the enclosure. Exterior fans move external air axially in and over the machine from both ends. Ribbed surfaces of the frame and end brackets help transfer heat to external air with the exterior bracket surface having ribs in an irregular and nonradial configuration to permit close placement of the exterior fan without excessive noise.

INVENTOR
Nikolaus Onjanow

DYNAMOELECTRIC MACHINE WITH IMPROVED COOLING MEANS

BACKGROUND OF THE INVENTION

1. Field of the Invention

The invention relates to improved cooling of dynamoelectric machines, particularly those of the totally enclosed fan cooled type.

2. Description of the Prior Art

Totally enclosed machines are used where isolation between internal parts and the environment is desirable or necessary. Since there is no flow of external air through the machine, such machines, particularly in larger sizes such as several hundred horsepower and above, are in most cases temperature limited in their rating. This is so even with external fan cooling.

Active machine parts of copper and magnetic steel are capable of developing much higher power than the power that can be produced continuously and still be cooled to a safe temperature. The maximum safe temperature is usually determined by the type of insulation in the machine. Notwithstanding improvement in insulation, it is still desirable to improve the heat transfer from the active parts to the exterior.

One of the most important heat transfer paths is that from the stator copper to the core, from the core to the frame, and from the frame to the outside air. Another important heat transfer path is that from the copper and iron to the internal air, from internal air to the frame, and from the frame to the outside air. Each path alone is usually insufficient to provide necessary cooling. Maximizing the heat transfer through one path has often resulted in a reduction in heat transfer through the other path. For example, in a widely used design in accordance with the prior art the frame has on its inner surface fins defining numerous small channels against the stator core. To some extent this configuration improves heat transfer from the internal air but, obviously, the metal to metal heat transfer path is impaired.

SUMMARY OF THE INVENTION

An object of this invention is to provide improved cooling means, particularly for totally enclosed fan cooled motors, with features that increase both the direct metal to metal heat transfer from the active parts to the frame as well as the heat transfer from the active parts to the internal air to the frame and end brackets.

Among other objects are to provide means for internal air circulation in totally enclosed motors while still providing a substantial direct path from core to frame; provide an improved interior fan and end bracket configuration for better heat transfer of heat from the air in the end bracket spaces to the bracket and frame parts; provide an improved exterior fan and frame configuration, particularly desirable for lowering the temperature of the rear bearing which is important for large motors; and providing an exterior surface configuration for end brackets that may be closely spaced from exterior fans without producing excessive noise.

Several of the features of the invention may be used separately with advantage over the prior art. However, the inventive features are preferably used in combination as they mutually cooperate to provide substantial improvement in cooling totally enclosed machines so that overall a substantial improvement in rated output horsepower for continuous duty, typically of about 25 percent, is attained.

Briefly, the improvements in accordance with this invention include a frame having some axial channels but with an inner surface enclosing the channels so that there is essentially total contact between the stator core and the frame. The frame channels are relatively few in number, such as about four, so as to leave a direct radial heat transfer path through metal from the core to the exterior over the great majority of the core surface. The frame channels are of sufficient size, however, such as a few inches in cross-sectional dimensions, to permit substantial airflow therethrough that is initiated by interior fans mounted on the machine shaft. A first fan at the front of the machine determines the direction of airflow. This fan forces air radially outward from the shaft against the frame parts and through the channels into the opposite end bracket space for return flow through rotor channels. Additionally, both interior fans are at least partially enclosed by the end brackets within hollows or cavities therein so that a substantial segment of airflow is produced by the fan directly against the concave end bracket surfaces, which may be finned, for improved heat transfer from the internal air to the brackets. Exterior fans move external air axially in and over the machine from both ends through hoods. To permit these exterior fans to be closely spaced to the end bracket outside surfaces to realize good heat transfer it is preferred that these surfaces be ribbed but in an irregular and nonradial configuration so as to avoid excessive noise. Also it is preferred that when such irregular bracket ribs are used that there also be used exterior fans with unequal blower blade spacings.

DESCRIPTION OF THE PREFERRED EMBODIMENTS

The invention will be described with reference to an embodiment that is an AC motor of the totally enclosed fan cooled type. The embodiment described is one that has been made in various sizes for operation in the range of from about 500 horsepower to about 1000 horsepower.

Figure 1:
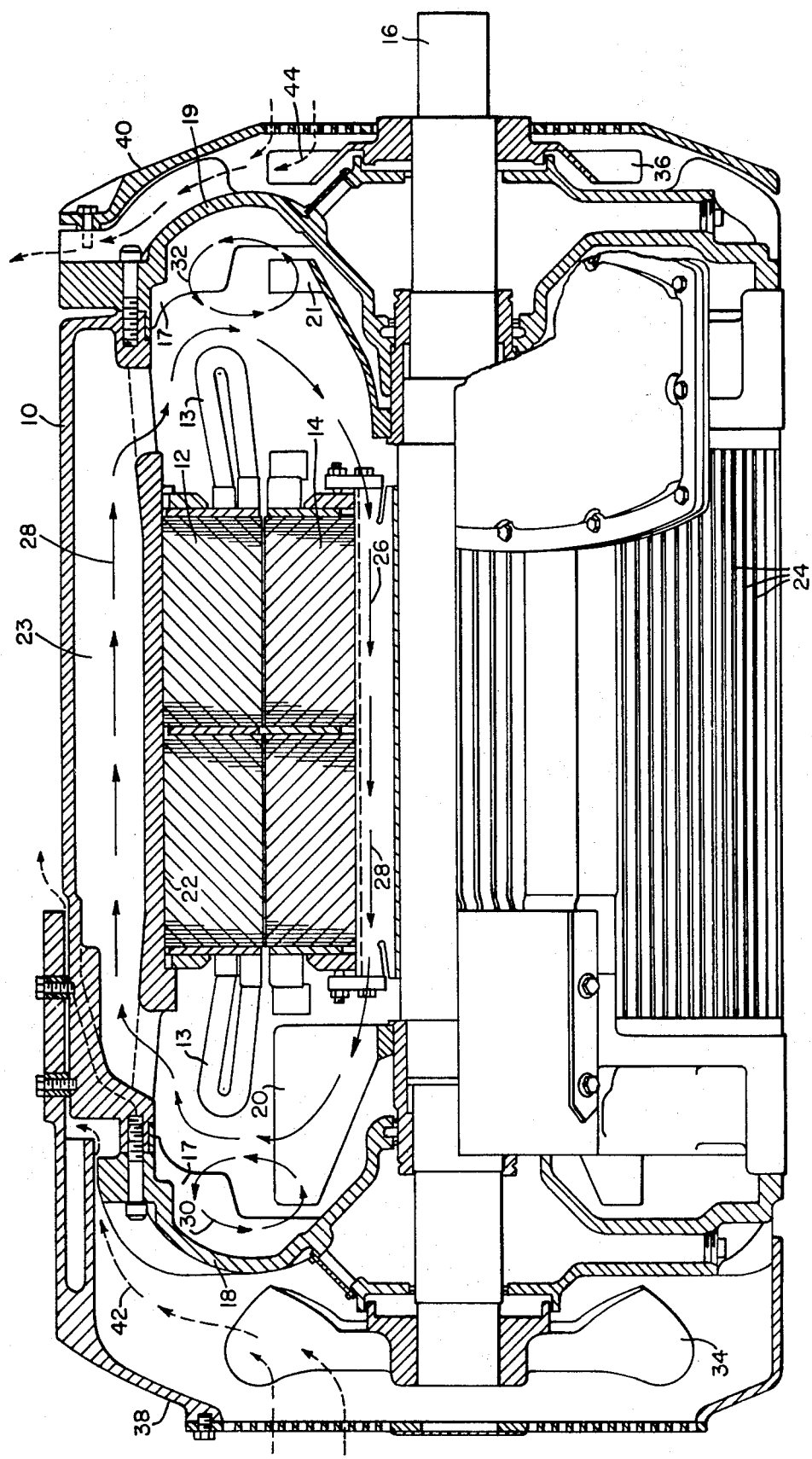
FIG. 1 is a longitudinal view, partly in elevation and partly in section, of a dynamoelectric machine in accordance with one embodiment of the invention.

Referring to FIG. 1, the motor in accordance with this invention includes a frame 10 that has a generally cylindrical configuration and within which is affixed the stator core 12, such as one of a plurality of stacked laminations, with a winding 13 therearound. A rotor 14, such as one also of a stack of laminations, is on a shaft 16. End brackets 18 and 19 (sometimes called end bells) cooperate with the cylindrical frame portion 10 to totally enclose the rotor and stator. Within the enclosure defined by the frame 10 and end brackets 18 and 19 there are also front and rear shaft mounted fans 20 and 21, respectively, with radially extending blades. The shaft 16 extends through the end brackets 18 and 19 and is rotatable by means of suitable bearings that are not detailed.

Figure 2:
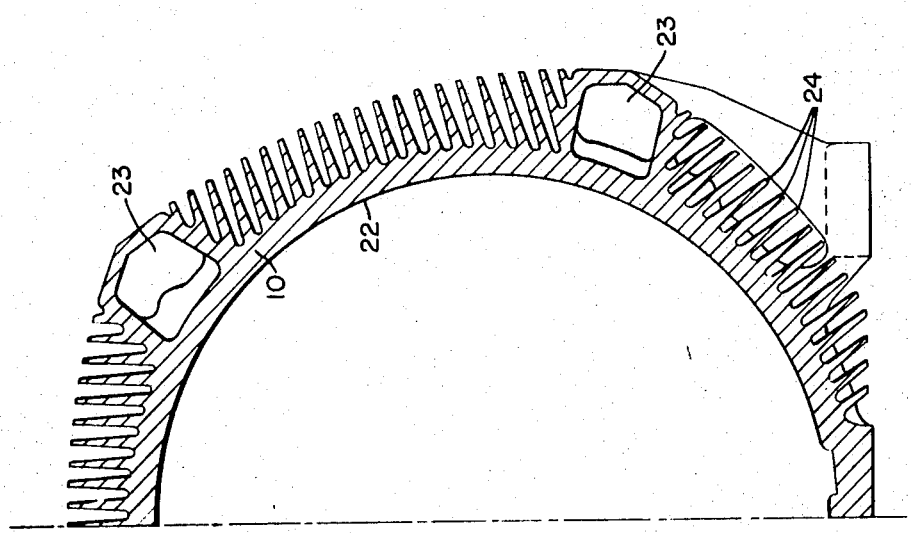
FIG. 2 is a cross sectional view of the frame of the machine shown in FIG. 1.

The frame 10, shown in cross section in FIG. 2, is characterized by having a cylindrical wall 22 that is essentially unbroken and makes direct contact with essentially all of the outer surface of the stator core 12. The frame 10 is also characterized by a plurality of axially extending channels 23 for airflow. These channels 23 are separated from the stator core 12 by the inner frame wall 22. The remainder of the frame wall 22 has heat dissipating fins 24 extending from it.

The frame channels 23 are few in number but are individually relatively large in cross section. Generally speaking, it is desirable that the frame channels 23 occupy only a small fraction of the total frame circumference. This small fraction, not greater than one-third, and preferably no more than about one-fourth, is desirable so that there is a direct metal to metal heat transfer path from the core 12 through the frame 10 to the exterior air over by far the major portion of the core surface. In this embodiment the channels 23 are limited to four in number, although such number is not critical, and they occupy merely about 20 percent of the frame circumference. The cross-sectional area of the individual channels 23 is also not critical but is preferably relatively large to facilitate high volume airflow therethrough. As a typical example, the frame channels 23 may have cross sectional dimensions of about 3 inches where the inner frame wall 22 thickness is roughly 1 inch and the overall machine diameter is about 30 inches.

The rotor 14 also has a few axially extending channels 26 for air flow therethrough to form a closed path. Starting at the front end bracket space, the interior air is given a radial velocity by the front interior fan 20 forcing air against the interior surface of the end bracket 18 and against the interior surface of the front end of the frame 10. A portion of the radially forced air passes through the frame channels 23 and around through the space adjacent the rear end bracket 19 and returns through the rotor channels 26 in continuous circulation as shown by arrows 28.

Another portion of the air from the front fan 20, which may be separately described but which of course mixes with the channel circulated air, strikes the surfaces of end bracket 18 within a recessed portion producing turbulence and circular airflow in the confined end bracket space as shown by arrows 30. Such airflow (arrows 32) also occurs at the rear end bracket space where the fan 21 is within a recess in the end bracket 19. The front interior fan 20 has elongated blades that extend at least partially within the bell-shaped recess of the end bracket. The end brackets 18 and 19 have a configuration essentially like that of a concave annulus (i.e., concave from the inner periphery on the shaft 16 to the outer periphery attached to the frame 10). The inner surfaces of the end brackets preferably have fins 17 extending therefrom for increasing the turbulence and improving heat transfer directly to the bracket parts.

It is therefore seen that maximum cooling is provided by two types of heat transfer. First is that directly from the stator core 12 to the frame 10 to the exterior air which is maximized by reason of the total contact of the core 12 by the frame wall 22 which is not substantially interfered with by the presence of the described frame channels 23. Additionally, heat is removed from the rotor 14, as well as other machine parts, by the circular airflow between the two end bracket spaces and is transferred from the air to the end bracket and frame surfaces by reason of the turbulence in the inner cavities of the end brackets 18 and 19 resulting from the disclosed configuration.

The machine in accordance with this invention also comprises front and rear external fans 34 and 36, respectively, mounted on the shaft 16 and each driving air axially inward and over the end brackets and frame. The front external fan 34 is conventional in totally enclosed fan cooled motors. In this embodiment, the rear external fan 36 is an additional assistance for cooling the rear end bracket surface and is particularly helpful for cooling the rear bearing. The external fans 34 and 36 are partially enclosed within hoods 38 and 40 with vented end faces. The hoods 38 and 40 also have openings between them and the frame exterior for outward flow as shown by arrows 42 and 44. The air from the front fan 34 will flow over and between the fins 24 on the frame outer surface. The means for joining the various members are not in themselves a part of this invention and are not shown in detail.

Figure 3:
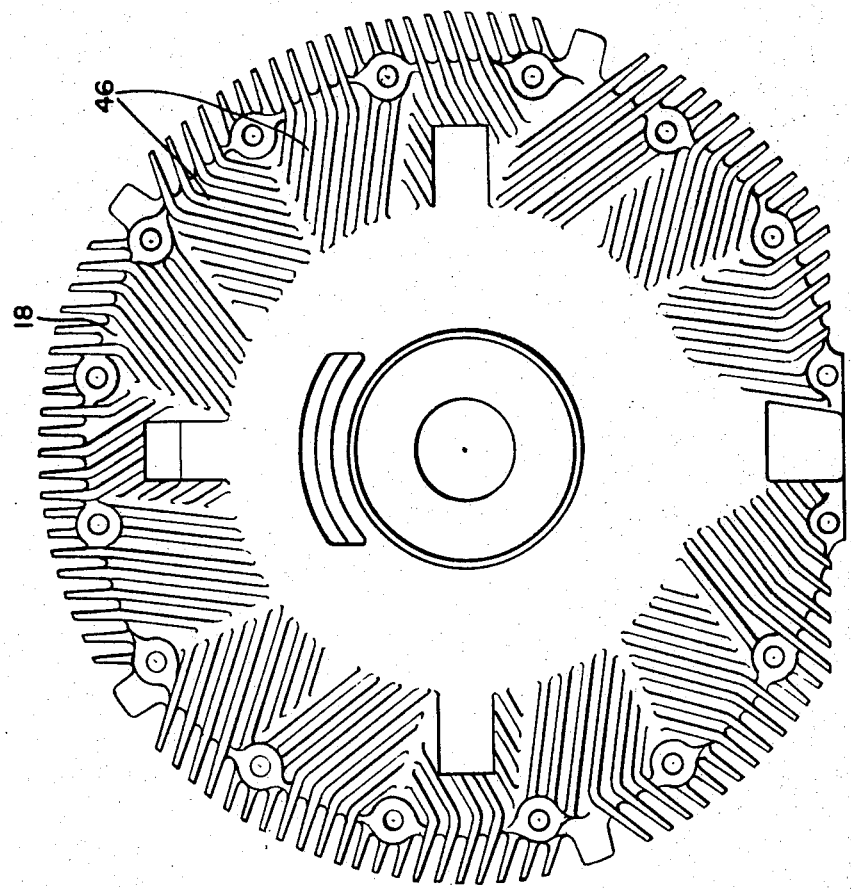
FIG. 3 is an elevation view of the exterior of one of the end brackets of the machine of FIG. 1.

In the use of exterior fans for cooling totally enclosed machines it has been found that if the exterior fan is placed too close to the exterior surface of the end bracket it produces discrete tones in the noise spectrum at the blade frequency and its multiples. If the fan is placed at a distance from the end bracket to avoid this noise, the turbulence of surface air layers may be reduced and the fan's effectiveness in cooling is reduced. However, in accordance with this invention, it has been found and is preferred that the exterior fans, particularly the larger front fan 34, be placed as close as possible to the end bracket surface but that the end bracket surface be ribbed in an irregular and nonradial manner as illustrated in FIG. 3 which has been found effective to reduce noise. Furthermore, it is preferred that the exterior fan blades have unequal spacing for noise reduction.

FIG. 3 shows the outside of end bracket 18 with fins 46 that are not radial and not all of which are mutually parallel.

It is possible, but not preferred, to employ individual features of invention alone. For example, the frame 10 configuration with the described channels 23 for airflow therethrough and return flow through the rotor channels 26 may be employed without the described configuration of the interior fans 20 and 21 and end brackets 18 and 19 to provide increased turbulence for air to metal heat transfer. On the other hand, such fan and end bracket configurations may be used without the described circular flow through the channel and rotor channels. The airflow through the frame channels is not itself relied on for a significant cooling effect of the internal parts but is important for circulation to maintain high radial and tangential velocity of the air in the end bracket spaces. Without such circulation there may occur dead regions with low air velocity.

Besides its effectiveness in direct cooling of the stator core 12, the frame wall 22 may be of adequate thickness to allow it to stand higher internal explosion pressures in explosion proof applications.

Although the direct radial heat transfer path from the core to the frame is important for cooling it is also useful in that the frame wall 22 conducts heat axially beyond the core for dissipation from those portions of the frame extending axially beyond the core.

An important feature is that the interior fans 20 and 21 are primarily to direct air against the frame and end bracket parts and not against the active machine parts. That is, as shown in FIG. 1, the blades of interior fans 20 and 21 extend axially substantially beyond the extend of the stator winding 13. In fact, the blades of fan 21 are disposed entirely beyond the winding 13. Such configuration improves upon those machines where the internal air is forced against the stator and rotor by fans which do not extend beyond the stator winding end turns into bracket cavities because by the time such air reaches the bracket surface most of its velocity is lost.

While the invention has been described in a few forms only, it will be apparent that numerous changes may be made without departing from its true scope.

I claim as my invention:

1. A dynamoelectric machine with improved cooling means comprising: a frame including a substantially continuous and substantially cylindrical wall and a plurality of axially extending enclosed channels on less than one-third the circumference of said wall; a pair of end brackets joined one at each end of said frame and enclosing a space with said frame; a rotatable shaft extending through said end brackets; a rotor on said shaft within said space, said rotor having a plurality of axially extending channels; a stator affixed within said frame around said rotor with direct contact over substantially all the exterior stator surface with said frame wall for direct heat transfer; a first interior fan within said space on said shaft between said rotor and one of said end brackets for establishing circular airflow from said fan through said frame channels and back through said rotor channels.

2. The subject matter of claim 1 wherein: said end bracket adjacent said fan is concave inward between said shaft and said frame wall and at least partially encloses said fan for airflow thereagainst from said fan.

3. The subject matter of claim 2 further comprising: a second interior fan is within said space on said shaft between said rotor and the other of said end brackets; said other end bracket is concave inward between said shaft and said wall and at least partially encloses said second fan.

4. The subject matter of claim 3 wherein: a plurality of fins are located on the exterior surface of said frame and on the interior and exterior surfaces of said end brackets.

5. The subject matter of claim 4 wherein: first and second exterior fans are on said shaft outside said space for directing airflow axially inward and over said end brackets; and hood means partially enclosing said exterior fans.

6. The subject matter of claim 5 wherein: at least one of the exterior end bracket surfaces has ribs that are not radially extending including a plurality of nonparallel ribs.

7. A dynamoelectric machine with improved cooling means comprising: a rotor and a stator totally enclosed by an enclosure having a configuration approximating that of a cylinder with closed ends, a shaft extending from said ends; a fan mounted on said shaft outside said enclosure at at least one of said ends; said fan being configured to direct air on to said end and over said enclosure; said end having an exterior surface facing said fan having ribs for increasing turbulence of said air, said ribs on said exterior surface facing said fan including at least some that are not radially extending and are not mutually parallel.